July 1, 1941.  E. L. SUTTER  2,247,717

EMERGENCY TIRE TRUCK

Filed Jan. 7, 1941

Inventor

E. L. Sutter

By Mason Fenwick & Lawrence
Attorneys

Patented July 1, 1941

2,247,717

UNITED STATES PATENT OFFICE 2,247,717

EMERGENCY TIRE TRUCK

Erwin Louis Sutter, Boston, Mass., assignor to The Sutter Co., Inc., Allston, Mass.

Application January 7, 1941, Serial No. 373,495

6 Claims. (Cl. 280—61)

This invention relates to an emergency flat tire truck for supporting the disabled wheel of an automobile so as permit the automobile to be driven under its own power to a repair station without damage to the wheel or tire. This application constitutes a continuation in part of my co-pending application Serial No. 346,839, filed July 22, 1940.

One of the objects of the invention is to provide a wheeled device of the character described upon which the disabled wheel may be driven, and which will automatically chock the wheel in place on the truck, obviating the need of any other fastening means so that the automobile may be driven at fair speed without the risk of the wheel jumping the truck or becoming displaced relative thereto in any other manner.

Another object of the invention is to provide a truck of the type described, having a wheel supported body or chassis comprising rigidly related side members and an inclined front end member with a flat transverse bottom member, forming a stall or compartment for receiving the disabled wheel, and having a swingable member at its opposite end hingedly mounted at an intermediate point constituted to act as a ground gripping platform upon which the wheel mounts in being driven upon the truck, without lifting the truck wheels from the ground or pushing the truck before it, and which tilts under the weight of the disabled wheel when the latter has moved to its fully seated position upon the truck, cooperating with the inclined front end member to chock the wheel against displacement.

Still another object of the invention is to provide a flat tire truck in which the ramp or tilting platform is locked, in chocking position, by the weight of the disabled wheel, so that the platform may act as a pushing member, permitting the vehicle to be backed as well as driven forward without displacing the truck.

Another object of the invention is to provide a truck in which the ramp locking member has the form of a flat bar hinged at the front of the truck, and having its free end overlying the forward end of the extended ramp, adapted when displaced by the weight of the wheel, to enter the wheel rim channel for centering the wheel longitudinally relative to the truck, making the truck track in the longitudinal path of movement of the vehicle without swerving.

Still another object of the invention is to provide for the locking bar to rest upon the transverse plate when in wheel supporting position, and when the ramp is in raised, locked position, whereby four open spaces in the bottom of the truck are defined, into which the deflated tire bulges, thus firmly gripping the truck and preventing slippage between truck and wheel forward and rearwardly as well as in a lateral direction.

A further object of the invention is to provide a truck as described, in which the wheel supporting members including the pivoted platform, are flat, and the pair of truck wheels adjacent the pivoted platform are carried outside the body laterally of the platform so that they cannot possibly come into contact with the sides of the tire of the disabled wheel.

Another object of the invention is to place the front supporting wheels of the truck outside of the wheel seating compartment and within the confines of the extended front ends of the side members, whereby the front of the wheel base of the truck is narrower than the rear, facilitating its dirigibility when used on one of the front wheels of the automobile.

Another object is to provide means to adequately protect the engaged portions of a deflated tire without pinching or bruising the same while at the same time utilizing such portions of the tire to provide a frictional engagement between the wheel and the device to prevent rotation of a driven wheel therein.

Other objects of the invention will appear as the following description of a preferred and practical embodiment thereof proceeds.

In the drawing which accompanies and forms a part of the following specification, and throughout the several figures of which the same characters of reference have been employed to designate identical parts:

Figure 3:
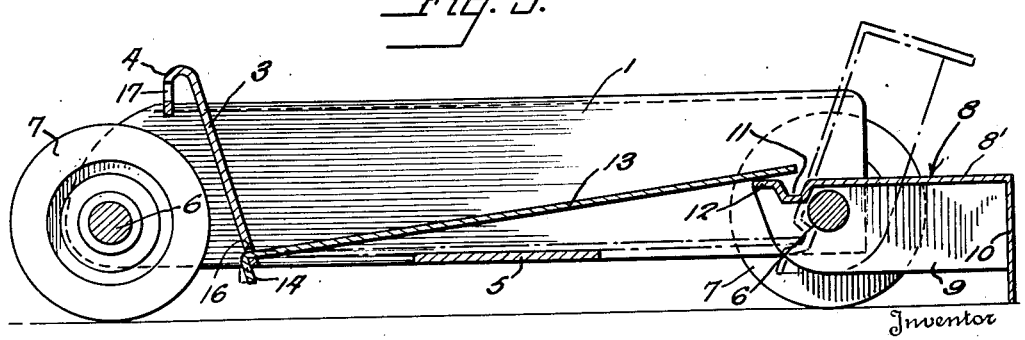
Figure 3 is a longitudinal vertical section through the same.

Referring to the drawing which illustrates a preferred embodiment of the invention it will be seen that it is formed of two substantially vertical side members 1—1, the upper edges of which are outwardly flared as at 2—2, which side members are rigidly connected at what will be referred to as the forward end by an inclined end wall 3, the upper edge of which is also outwardly flared and turned down as at 4, and further connected by a bottom plate 5 of substantially less width then the length of the side members and medially positioned thereof so as to provide open spaces both forward and rearwardly of this bottom plate. The said members extend forwardly of the forward end 3 and are provided with journal openings for a transverse shaft 6 upon which are mounted traction wheels 7 between the side members. A similar shaft 6 is journaled between the rear ends of the side members and upon this shaft is pivotally mounted the rear end wall 8 which is provided with a flat upper face 8', depending side flanges 9 and a rear downwardly depending flange 10 substantially perpendicular to the flat face 8', the bottom of which flange is adapted to engage the ground when in contact therewith, in which position, as illustrated in Figure 3, it will be noted that the upper flat face 8' is substantially horizontal. This pivoted end member is pivoted, it will be noted, intermediate its ends and the forward end is provided with a transverse detent 11 associated with a forwardly directed lip 12. The rear traction wheels 7—7 are mounted on the rear shaft 6 but outside of the side members and below the outwardly flared upper edges of said side members.

The forward end 3 is provided near its bottom edge with a transverse slot 16 adapted to provide a pivot for a longitudinal member 13, the forward end of which is notched on each side to provide shoulders 15—15 and a tongue 14 bent at right angles to the main body of the member. The tongue 14 being passed through the slot 16 provides a pivotal connection for this longitudinal member 13, which is of a length sufficient to permit its rear free end to seat on the forward lip 12 of the pivot end 8 when the latter is in extended horizontal position, and as illustrated in full lines in Figure 3.

Figure 1:
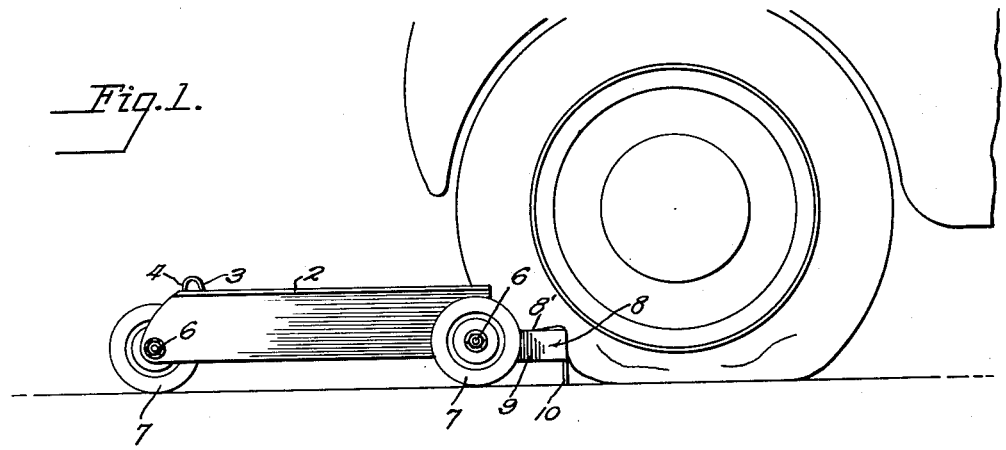
Figure 1 is a side elevation of an emergency wheel truck embodying the principles of the present invention, showing an automobile wheel with deflated tire being driven upon the emergency truck.
Figure 2:
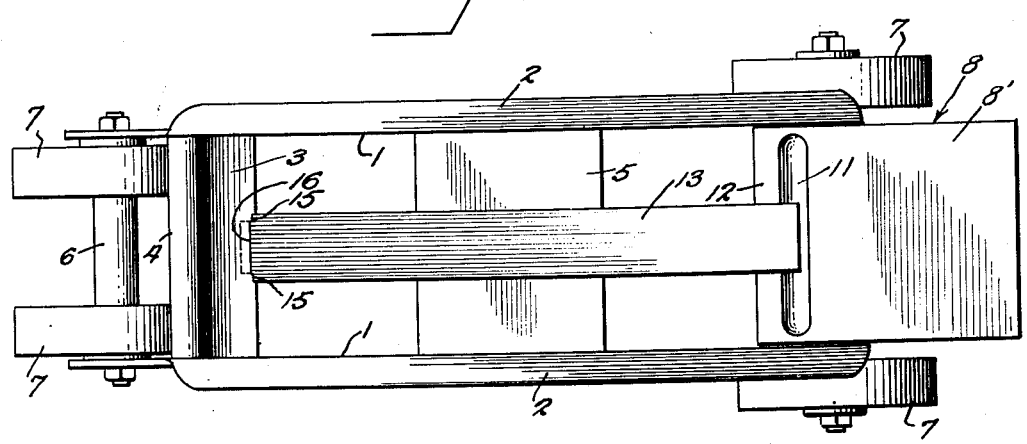
Figure 2 is a top plan view of the emergency truck.

In operation the device is placed in alignment with a vehicle wheel having a deflated tire as illustrated in Figure 1 with the rear pivoted end 8 extended into horizontal position and with its depending flange 10 in engagement with the ground. In this position it will be noted that the longitudinal member 13 is rocked upwardly as shown in Figure 3. The vehicle being advanced toward the device as suggested in Figure 1 will mount upon the extended end 8 as upon a step so as to direct the weight of the vehicle downwardly rather than forwardly and from that position the wheel will advance until it presses against longitudinal member 13 and as the wheel rides toward the center of the longitudinal member 13 and gradually releases the pivoted step end 8, the weight of the vehicle will depress the longitudinal member 13 and rock the pivoted end 8 into an inclined position, as illustrated in dotted lines in Figure 3, in which position it will be noted that the free end of the pivoted member 13 will enter the detent 11 and thus lock the pivoted end 8 in chocking relationship to the wheel. In that position it will be noted that the deflated tire will be protected so far as it engages the emergency truck between outturned flanges 2—2 of the side walls and thereby from the rear track wheels 7—7 of the device, and will also be protected by the outwardly turned upper edge 4 of the forward end member. Furthermore, by reason of the open spaces on each side of the bottom plate 5 portions of the deflated tire will be forced downwardly into such spaces thus providing increased frictional engagement between the truck and the wheel to prevent rotation of the wheel in the truck where the wheel happens to be one of the rear or driving wheels of the vehicle.

Preferably the longitudinal rocking and locking member 13 is of a width slightly less than the usual width of tire rims between flanges thereof so that this locking member will seat between the flanges of the tire rim and support the wheel from the bottom of the rim rather than by the flanges and thus eliminate the danger of rim bruising the tire against plate 5.

A hole 17 may be provided in the downturned rim 4 of the forward end wall 3 in which may be engaged a chain or strap (not shown) by means of which the truck may be secured to the running board or some other part of the vehicle if desired in connection with abnormally steep grades. Ordinarily, however, the chocking end walls 3 and 8 will, in conjunction with the frictional engagement of the deflated tire against the side walls of the truck amply secure the truck in operative position.

Various modifications of the device will readily suggest themselves to those skilled in the art, but all within the scope of the present invention as claimed.

Having thus fully described my invention, I claim:

1. In an emergency truck having a frame comprising side members, a fixed chock end, a pivoted chock end and supporting traction wheels, a bottom member pivoted intermediate the side frame members adapted to seat between the flanges of a vehicle wheel rim and means for interengaging said bottom member and the pivoted chock end whereby the weight of the vehicle wheel on said bottom member will rock the pivoted end member into chocking position and lock it in said position.

2. Emergency truck as specified in claim 1 with a bottom member pivoted at one end adjacent the bottom of the fixed front chock member and having its free end extending above the inner end of the pivoted chock member, said end of the pivoted chock member being formed with a transverse detent, whereby the weight of a vehicle wheel on said pivoted bottom member will rock the pivoted end member and cause the free end of the bottom member to lockingly engage said detent.

3. In a truck of the character specified having a frame and traction wheels, a tiltable chock end pivoted intermediate its ends and a pivoted longitudinally extending bottom and locking member on which a vehicle wheel is adapted to rest, said member having one end positioned to engage the inner end of the tiltable chock end.

4. In a truck of the character specified having a frame and traction wheels, a tiltable chock end pivoted intermediate its ends and a pivoted longitudinally extending bottom and locking member on which a vehicle wheel is adapted to rest, said member having its free end adapted to overlay the inner end of the tiltable chock end when the latter is in its horizontal position with means for lockingly interengaging said longitudinal bottom member and said chock end when the latter has assumed its tilted position.

5. In a truck of the character specified having a frame and traction wheels, a tiltable chock end pivoted intermediate its ends and having a transverse detent formed adjacent its inner end and a longitudinally extending bottom and locking member pivoted at one end and of sufficient length for its free end to extend above said detent when the chock end is in its horizontal position and to enter said detent and lockingly engage said pivoted chock end when said chock is tilted.

6. An emergency truck for automobile wheels, comprising side frame members, a fixed chock end and traction wheels, a step member having a tread part and a riser part perpendicular thereto, means for pivotally supporting the step member between the side frame members with the pivotal axis adjacent the tread part and spaced intermediate the riser and the opposed edge of the tread part, said tread part formed with a detent between said axis and said edge opposite the riser part, a bottom member pivoted at one side adjacent the bottom edge of the fixed chock end and arranged so that its free end will overlie the detent in the tread of the step member when said tread is in its horizontal position and will enter the said detent when said step member is tilted on its axis to an inclined chocking position.

ERWIN LOUIS SUTTER.